United States Patent [19]

Zeidl

[11] Patent Number: 4,538,936
[45] Date of Patent: Sep. 3, 1985

[54] FRAME CORNER

[75] Inventor: Horst J. Zeidl, Midland, Canada

[73] Assignee: TRW Automotive Products, Inc., Romeo, Mich.

[21] Appl. No.: 559,582

[22] Filed: Dec. 8, 1983

[51] Int. Cl.³ .................. F16B 12/50; G09F 1/12
[52] U.S. Cl. ........................ 403/402; 403/297; 403/348; 40/155
[58] Field of Search .......... 403/401, 402, 348, 350, 403/297; 40/155

[56] References Cited

U.S. PATENT DOCUMENTS 4,283,157  8/1981  Kowalski .................. 403/297

FOREIGN PATENT DOCUMENTS 110872   6/1940  Australia .................. 403/350
2716295  1/1978  Fed. Rep. of Germany ...... 403/402

Primary Examiner—Andrew V. Kundrat
Attorney, Agent, or Firm—Yount & Tarolli

[57] ABSTRACT

A joint is formed by positioning a connector within channel members to be joined which has a rotatable eccentric with different length radii to engage the lateral edges of the channels, and rotation of the eccentric causes its longer length side to engage the channel edges first, bringing the channel members tightly together as they are fastened.

19 Claims, 6 Drawing Figures

FRAME CORNER

BACKGROUND OF THE INVENTION

This invention is directed to connectors for tightly joining together extruded lengths of aluminum channel or the like. Within this field it is well known to encompass a glass or picture area within a frame whose channel members are held together by corner connectors which are fastened to the channel by devices acting at right angles to the area or the channel.

Examples of threaded devices which act in a direction normal to the framed area are the Canadian Pat. Nos. 535,351 (1958) to Secord, and 1,035,952 (1978) to Nielsen; and U.S. Pat. No. 3,018,861 (1962) to Somville, all of which employ screws driven against the base of the rail. In Canadian Pat. No. 925,292 (1973) to Vihma a channel-rail is gripped between a nut and bolt; other patents showing gripping through threaded members are U.S. Pat. Nos. 2,654,451 (1953) to Schmidgall, 2,816,632 (1957) to Nardulli, and 2,947,391 (1960) to Wayne. Another method is the tie-bar approach found in Canadian Pat. No. 826,550 (1969) to Myatt where force along the rail is applied by mean of cam surfaces engaged at right angles to the rail.

A further approach for joining lengths of channel is to insert longitudinal parallel gripping bars within specially formed channels, and separate these by screws or cams to clamp, as seen in U.S. Pat. No. 2,790,259 (1957) to Havens; such an approach cannot be used to join corners together, only straight lengths.

The disadvantages of the so-called threaded fastenings heretofore discussed are that set-screws, jack-screws, bolts and nuts are small end easily lost or misplaced. Further, being basically devices which apply force at right angles to the frame and its members, these screw devices do not apply a force component longitudinally of the channels in a direction to drive them into a tightly fitting joint.

Additionally, many channel cross-sectional configurations require special fasteners, and vice versa, tending to reduce applicability.

SUMMARY OF THE INVENTION

The invention includes a metal connector having ends positionable within the channel members to be joined. Fastening is accomplished through cam members on the connector, which are rotatable to engage and lock into the lateral edges of the open channels within which they are located. Preferably, the cams are also eccentric with different length radii, such that the longer length side engages the channel edge first and applies a longitudinal force component to create a tight joint.

DESCRIPTION OF THE PREFERRED EMBODIMENTS

Figure 1:
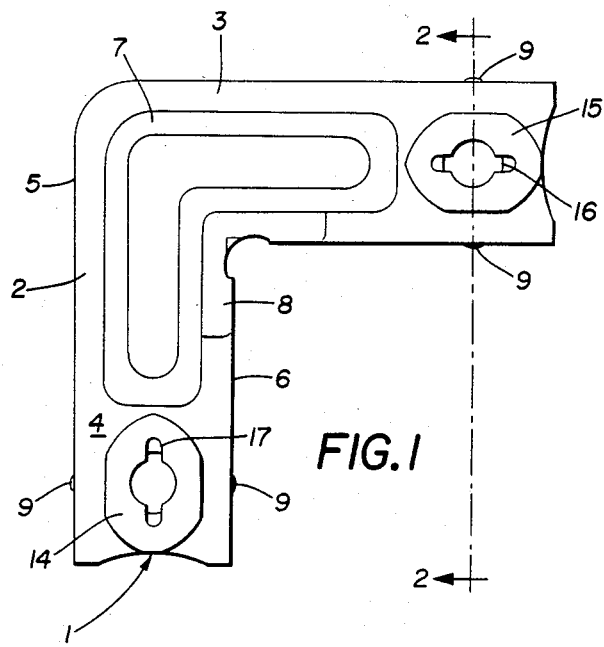
FIG. 1 is a top plan view of a corner connector of the invention.
Figure 2:
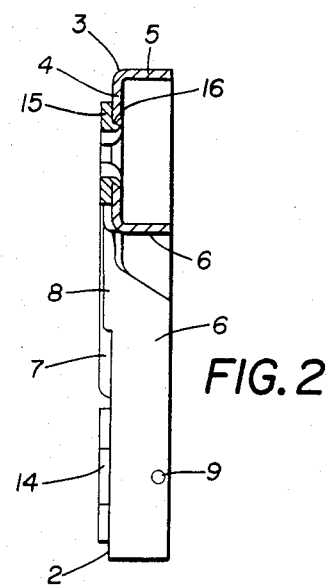
FIG. 2 is a view of the connector along line 2—2 of FIG. 1.
Figure 3:
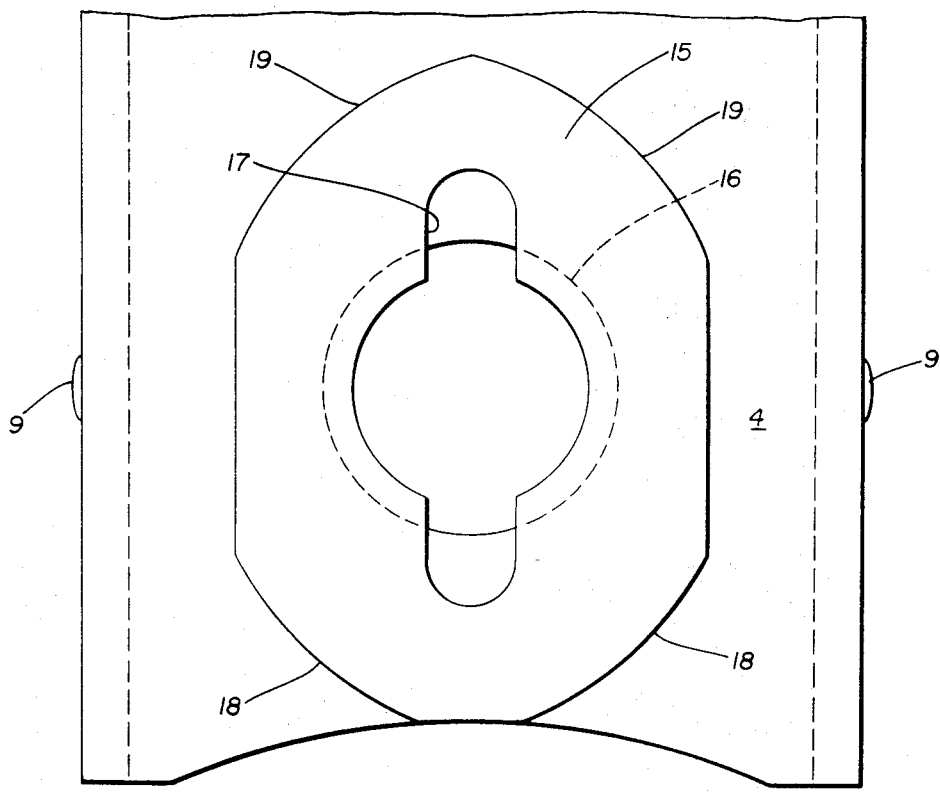
FIG. 3 is an enlarged, fragmentary top plan view of the connector, showing in particular a cam thereof.

The connector 1 is shown in FIG. 1 in the L-shaped corner-connector version, with right-angle legs 2 and 3 and a body having a U-shaped cross-section with top 4 and sidewalls 5 and 6. The connector is preferably of steel and is seen to have a form which lends itself to stamping. Along its top 4, there are formed embossments 7 and 8 for additional rigidity. The internal and external sidewalls 5 and 6 may be provided with other embossments 9, for purposes to be described hereafter.

Overlying legs 2 and 3 are cams 14 and 15, respectively, each staked or riveted into opening 16 for rotation and against loss. A slot 17 is provided to accommodate a key or screwdriver with which the cam may be rotated.

The cam 15 will be seen to be eccentric, and to display camming surfaces of different radii, cam surfaces 18 have a longer radius than do cam surfaces 19, for purposes to be explained now.

Figure 4:
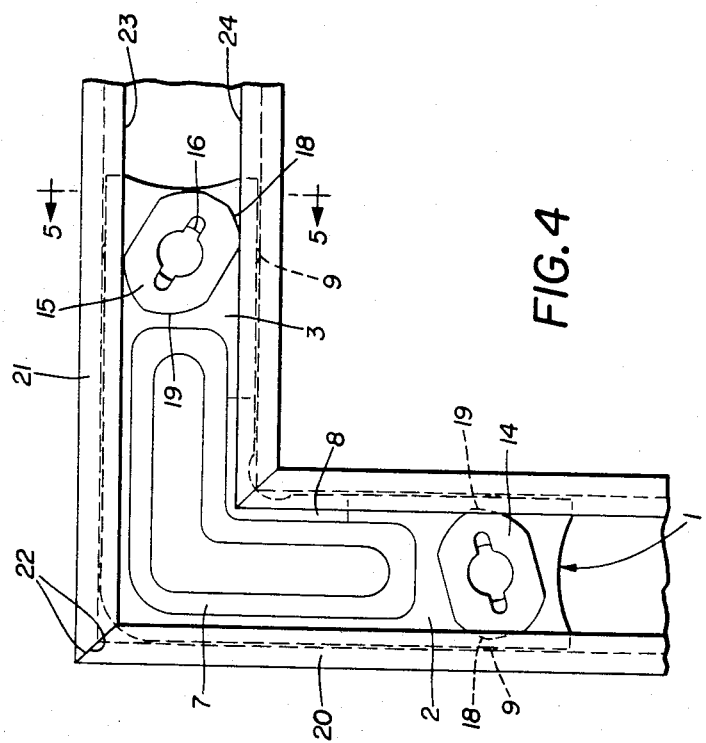
FIG. 4 is a fragmentary, top plan view showing the connector in place between segments of frame channels.

In FIG. 4 is seen the corner connector 1 with legs 2 and 3 inserted in pieces of channel 20 and 21, respectively. The channel pieces have each been cut at a 45° angle as at 22, and together form a right angle.

Figure 5:
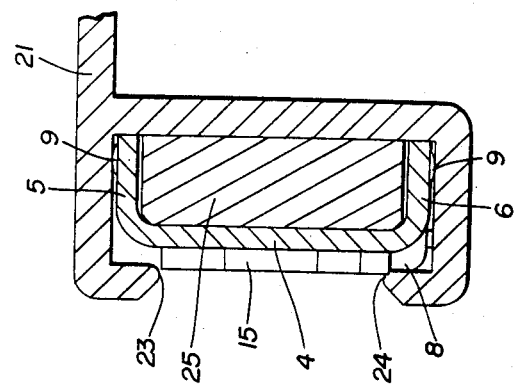
FIG. 5 is an enlarged cross-sectional view taken along line 5—5 of FIG. 4.

The embossments 9 cause the sides of the connector, as will appear from FIG. 5, to fit closely within the frame channel 21, whose open lateral edges extend over the top of the connector. The cam 15, shown in its original position in FIG. 1, may now be turned by applying a key or screwdriver blade to slot 17. The cam surfaces 18 and 19 approach the channel edges 23 and 24, with the longer cam surface 18 reaching edge 24 first; this is the situation shown by cam 15 in FIGS. 4 and 5. Upon further turning of the cam, the cam surface 18 will apply a longitudinal component of force to the channel 21, tending to drive it toward the corner, as both cam surfaces 18 and 19 then simultaneously start to dig in laterally into the underside of the edges 23 and 24.

With continued turning of the cam, the steel cam continues biting into the channel edges, preferably of aluminum, making room for itself as necessary by displacing small chips of metal and approaching a locked position as shown by cam 14 in FIG. 4. It will be noted that lateral biting by the cam into the channel edges is facilitated by the top of the cam lying below the top channel edges. Although the actual clamping force is applied entirely in a lateral direction, the tightening of the cam into the metal of the channel produces playless engagement between the cam, the body 4, 5, 6 of the connector and the channels 20, 21.

Figure 6:
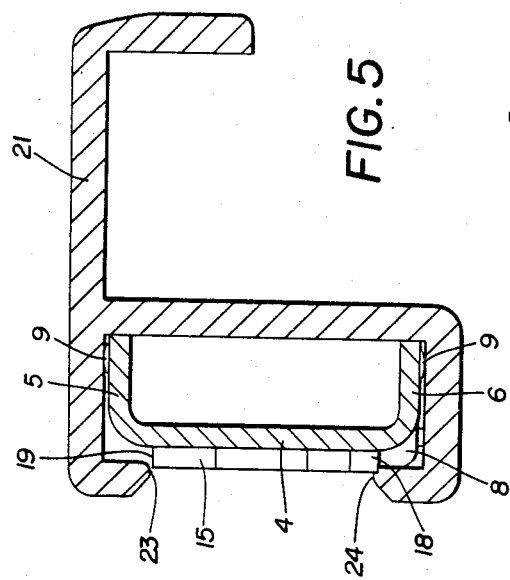
FIG. 6 is an enlarged view, similar to FIG. 5, but showing a modification of the invention.

The embossment 8 at the inner corner of the connector will be seen to be an additional means for eliminating clearance directly beneath the meeting surfaces of the channel pieces 20, 21 at their inner corner.

Where additional stiffness might be required in extremely heavy framing, a right angle corner reinforcement 25 may be inserted under the connector body, as shown in FIG. 6.

Although the above description has been directed to the right-angle corner connector, the same fastening principle may, of course, be applied to the fastening together of two lengths in extension to each other, by the use of a straight connector in place of the L-shaped device.

I claim:

1. A joint comprising:
   (a) two lengths of grooved metal sections;
   (b) a connector having end portions insertable into a groove in each of said sections;
   (c) a cam on each of said connector end portions; and
   (d) means on each said cam for turning it laterally into locking engagement with first and second edges of its associated groove;
   (e) each said cam being eccentric and having a first side which upon turning of said cam engages the first edge of said groove before a second side of said cam engages the second edge of said groove.

2. Joint as in claim 1, wherein the said section lengths comprise extruded channel members having opposed edges.

3. Joint as in claim 2, wherein said cam lies laterally between said opposed edges.

4. Joint as in claim 1, wherein said metal sections are mitered to form an angular joint.

5. Joint as in claim 1, wherein said connector is L-shaped.

6. Joint as in claim 1, wherein said connector has a U-shaped cross-section.

7. Joint as in claim 1, wherein said connector has a rectangular cross-section.

8. Joint as in claim 1, wherein said cam, upon lateral engagement displaces a portion of the metal of said edges.

9. Joint as in claim 1 or 8, wherein the said cam, upon lateral turning engages only the lower portion of said edges.

10. Joint as in claim 1, wherein the means to turn the said cam comprises a key-slot.

11. Device for joining metal lengths with grooves therein comprising:
    (a) a connector body having end portions insertable into the groove of each metal length;
    (b) a cam on each of said end portions; and
    (c) means on each said cam adapted for turning it laterally into locking engagement with the edges of the groove;
    (d) each said cam being eccentric and having a first side which upon turning of said cam engages a first edge of the groove before a second side of said cam engages a second edge of the groove.

12. Device as in claim 11, wherein said connector body is L-shaped.

13. Device as in claim 11, wherein said connector body has a U-shaped cross-section.

14. Device as in claim 11, wherein said connector body has a rectangular cross-section.

15. Device as in claim 11, wherein said cam, upon lateral engagement displaces a portion of the metal of said edges.

16. Device as in claim 11 or 15, wherein said cam, upon lateral turning engages only the lower portion of said edges.

17. Device as in claim 11, wherein the means to turn the said cam comprises a key-slot.

18. A joint comprising:
    (a) two lengths of grooved metal sections;
    (b) a connector having end portions insertable into a groove in each of said sections;
    (c) a cam on each of said connector end portions; and
    (d) means on each said cam for turning it laterally into locking engagement with first and second edges of its associated groove;
    (e) each said cam being eccentric and having opposite camming sides of unequal length.

19. Device for joining metal lengths with grooves therein comprising:
    (a) a connector body having end portions insertable into the groove of each metal length;
    (b) a cam on each of said end portions;
    (c) means on each said cam adapted for turning it laterally into locking engagement with the edges of the grooves
    (d) each said cam being eccentric and having opposite camming sides of unequal lengths.

* * * * *